United States Patent
Peng et al.

(10) Patent No.: US 9,685,183 B2
(45) Date of Patent: Jun. 20, 2017

(54) MAGNETIC LAYER

(71) Applicant: Seagate Technology LLC, Cupertino, CA (US)

(72) Inventors: Yingguo Peng, San Ramon, CA (US); Xiaowei Wu, Pleasanton, CA (US); Ganping Ju, Pleasanton, CA (US); Bin Lu, San Ramon, CA (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 80 days.

(21) Appl. No.: 14/451,779

(22) Filed: Aug. 5, 2014

(65) Prior Publication Data
US 2014/0342188 A1 Nov. 20, 2014

Related U.S. Application Data (62) Division of application No. 12/916,302, filed on Oct. 29, 2010, now Pat. No. 8,795,764.

(51) Int. Cl.
| | |
|---|---|
| *G11B 5/66* | (2006.01) |
| *G11B 5/65* | (2006.01) |
| *G11B 5/64* | (2006.01) |
| *G11B 5/84* | (2006.01) |

(52) U.S. Cl.
CPC ............ *G11B 5/653* (2013.01); *G11B 5/64* (2013.01); *G11B 5/65* (2013.01); *G11B 5/84* (2013.01)

(58) Field of Classification Search
CPC .......... H01F 10/08; H01F 10/10; H01F 10/12; H01F 10/123; H01F 10/14; G11B 5/647; G11B 5/653; G11B 5/66; G11B 5/667
USPC .................................................... 428/827, 829
See application file for complete search history.

(56) References Cited

U.S. PATENT DOCUMENTS

| | | | |
|---|---|---|---|
| 6,007,623 A | 12/1999 | Thiele et al. | |
| 6,086,974 A | 7/2000 | Thiele et al. | |
| 6,846,583 B2 | 1/2005 | Inaba et al. | |
| 7,083,870 B2 | 8/2006 | Shimizu et al. | |
| 7,282,278 B1 | 10/2007 | Nolan | |
| 7,314,675 B1 | 1/2008 | Nolan | |
| 7,588,841 B2 | 9/2009 | Berger et al. | |
| 7,608,348 B2 | 10/2009 | Faehler | |
| 8,795,764 B1 | 8/2014 | Peng et al. | |
| 8,900,730 B2 * | 12/2014 | Bhatia et al. | 428/834 |
| 2004/0161638 A1 | 8/2004 | Maeda et al. | |
| 2004/0185307 A1 | 9/2004 | Oikawa et al. | |

(Continued)

OTHER PUBLICATIONS

Zha et al. ("Gradient ordered L10 FePtCu films with graded anisotropy," 11th Joint MMM-Intermag Conference, Jan. 2010).*

(Continued)

*Primary Examiner* — Holly Rickman
(74) *Attorney, Agent, or Firm* — Hollingsworth Davis, LLC (57) ABSTRACT

An apparatus includes a substrate and a magnetic layer coupled to the substrate. The magnetic layer includes an alloy that has magnetic hardness that is a function of the degree of chemical ordering of the alloy. The degree of chemical ordering of the alloy in a first portion of the magnetic layer is greater than the degree of chemical ordering of the alloy in a second portion of the magnetic layer, and the first portion of the magnetic layer is closer to the substrate than the second portion of the magnetic layer.

18 Claims, 5 Drawing Sheets

(56) References Cited

U.S. PATENT DOCUMENTS

| | | |
|---|---|---|
| 2004/0191578 A1 | 9/2004 | Chen et al. |
| 2006/0002026 A1 | 1/2006 | Stipe et al. |
| 2007/0292720 A1 | 12/2007 | Suess |
| 2008/0299416 A1* | 12/2008 | Yoon et al. .................. 428/827 |
| 2010/0182714 A1* | 7/2010 | Kanbe et al. .................. 360/59 |
| 2010/0189886 A1 | 7/2010 | Peng |
| 2010/0200124 A1 | 8/2010 | Qiu et al. |

OTHER PUBLICATIONS

Aug. 5, 2014, File History for U.S. Appl. No. 12/916,302.

2011, Huang et al., "Deposition temperature induced magnetic anisotropy variation in FePT-C soft/hard multilayer films", Journal of Applied Physics, 109, 063910, 2011, 8 pages.

May 26, 2003, Li et al., "Interface structures in FePT/Fe3Pt hard-soft exchange-coupled magnetic nanocomposites", Applied Physics Letters, vol. 82, No. 21, May 26, 2003, pp. 3743-3745.

2008, Lim et al., "Improvement of chemical ordering of FePt (01) oriented films by MgO buffer layer", Journal of Applied Physics, 103, 07E143, 2008, 4 pages.

2006, Suess, "multilayer exchange spring media for magnetic recording", Applied Physics Letters, 89, 113105, 2006, 3 pages.

2005, Suess et al., "Exchange spring recording media for areal densities up to 10 Tbit/in$^2$", Journal of Magnetism and Magnetic Materials, 290-291, 2005, pp. 551-554.

Jun. 2010, Sun et al., "FePt-Based Exchange-Coupled Composite Perpendicular Recording Media", IEEE Transactions on Magnetics, vol. 46, No. 6, Jun. 2010, pp. 1795-1797.

Oct. 2005, Wang et al., "Exchange Coupled Composite Media for Perpendicular Magnetic Recording", IEEE Transactions on Magnetics, vol. 41, No. 10, Oct. 2005, pp. 3181-3186.

* cited by examiner

FIG. 8

MAGNETIC LAYER

RELATED APPLICATONS

This application is a divisional application of U.S. patent application Ser. No. 12/916,302, filed on Oct. 29, 2010, which is incorporated herein by reference in its entirety.

BACKGROUND

The present application relates generally to magnetic layers.

In one instance, magnetic layers may be present in recording media. Recording media can be utilized in a variety of applications, including, but not limited to, computers and communication applications. Data may be stored in digital format via electromagnetic encoding on a magnetized medium, where different patterns of magnetization may be read and/or written by a read-and-write head. To write, the head interacts with the magnetized medium by converting a magnetic field of a ferromagnetic grain of the medium to electric current or vice versa. To read, the head senses patterns of individual fields in the magnetized medium. The amount of data recordable upon a particular media arrangement is a function of the orientation of the grains in the magnetized media, such as being perpendicularly or horizontally arranged with respect to a recording surface. Perpendicular arrangement generally allows for a more compact medium, however the thermal stability of such a medium may be decreased.

SUMMARY

One embodiment relates to an apparatus that includes a substrate and a magnetic layer coupled to the substrate. The magnetic layer includes an alloy that has magnetic hardness that is a function of the degree of chemical ordering of the alloy. The degree of chemical ordering of the alloy in a first portion of the magnetic layer is greater than the degree of chemical ordering of the alloy in a second portion of the magnetic layer. The first portion of the magnetic layer is closer to the substrate than the second portion of the magnetic layer.

Another embodiment relates to a system, which includes a recording surface. The recording surface includes a magnetic layer that is at least partially configurable via a magnetic head. The magnetic layer includes an alloy that has a magnetic hardness that is a function of the molecular structure of the alloy. Further, the magnetic layer includes discrete sub-layers such that, within each sub-layer, the alloy has a consistent molecular structure, and between the sub-layers the molecular structure of the alloy varies.

Yet another embodiment relates to a process of manufacturing, which includes providing a substrate and an alloy. The alloy includes iron and platinum. The process further includes coupling a layer of the alloy and the substrate, and changing the temperature of the alloy to vary the degree of chemical ordering of the alloy with respect to distance from the substrate within the layer.

Alternative embodiments relate to other features and combinations of features as may be generally recited in the claims.

DETAILED DESCRIPTION

Before turning to the figures, which illustrate the embodiments in detail, it should be understood that the present application is not limited to the details or methodology set forth in the description or illustrated in the figures. It should also be understood that the terminology is for the purpose of description only and should not be regarded as limiting.

Figure 1:
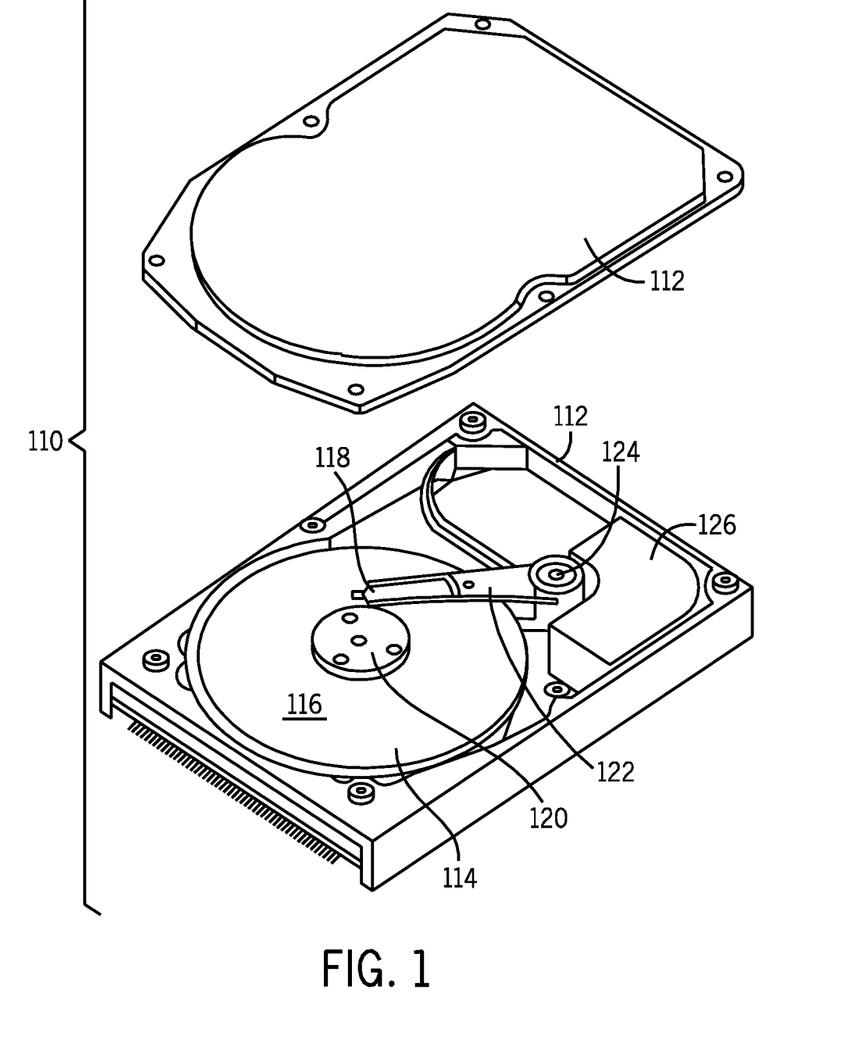
FIG. 1 is a perspective view of a schematic illustration of a disk drive according to an embodiment.

Referring to FIG. 1, a disk drive, such as a hard disk drive 110, includes a housing 112 supporting a recording media, such as a disk 114 having a recording surface 116 (e.g., platter, flat circular disk), and a head 118 (e.g., read-and-write head). In some embodiments, such as in disk drive 110, the recording surface 116 rotates about a spindle 120, and the head 118 is moved over the recording surface 116 by an arm 122 (e.g., actuator arm, access arm) that is rotated about a pivot 124 by an actuator 126, such as a voice coil actuator or a stepper motor. Although shown in FIG. 1 as disk 114 in hard drive 110, the recording media can be embodied as other types of media or have a variety of shapes or geometries. Further, the recording media can be utilized in a variety of storage devices.

Figure 2:
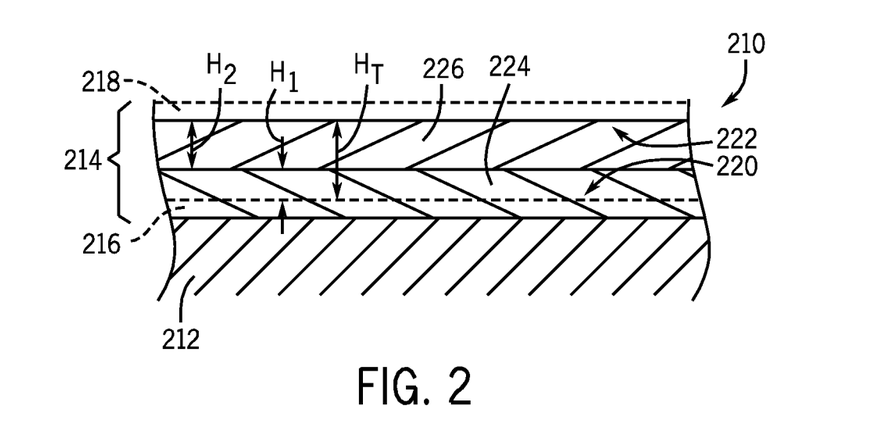
FIG. 2 is a sectional view of a schematic illustration of recording media according to an embodiment.

According to an embodiment, the recording surface 116 includes a magnetic layer (see, e.g., magnetic layer 214 as shown in FIG. 2), which has ferromagnetic grains. Each ferromagnetic grain has a magnetic dipole, and the localized magnetic field of the dipole is configured to provide binary information. As the head 118 passes over a grain on the recording surface 116, components of the head 118 (e.g., magneto-resistive read element, thin-film write element) are configured to detect the magnetic field of the grain and/or modify the field. In some embodiments the grains are generally arranged perpendicularly with respect to the recording surface 116.

According to other embodiments, a wide range of other non-removable or removable disk drives may include recording surfaces accessed via one or more fixed or moving heads. A head may not be included. The grains, in some contemplated embodiments, are arranged horizontally or are otherwise angled with respect to a recording surface. A recording surface may include more than one magnetic layer, and the recording surface may be cylindrical, spherical, rectangular, or otherwise shaped in some alternate embodiments.

Referring to FIG. 2, a recording media 210 includes a substrate 212 and a magnetic layer 214. The substrate 212 may be in the form of a disk of a disk drive (see, e.g., disk 114 and hard disk drive 110 as shown in FIG. 1), and may be at least partially formed from glass, aluminum alloy, composite, or another non-magnetic material. In some embodiments a seed layer 216 may be provided between the substrate 212 and the magnetic layer 214 to facilitate thin film development. In some such embodiments, the seed layer 216 includes magnesium oxide (MgO), ruthenium aluminum alloy (RuAl), copper (Cu), chromium (Cr), molybdenum (Mo), tungsten (W), and/or other materials. In contemplated embodiments, seed- and/or under-layers consist of several layers, including a soft under-layer (SUL). Also, in some embodiments an overcoat 218 of carbon (C) or another material and/or lubricant may be provided over the magnetic layer 214 for protection and/or support thereof.

According to an embodiment, the magnetic layer 214 is formed from a single alloy that has a magnetic hardness (denoted by "$H_K$") that is a function of the degree of chemical ordering of the alloy. In some such embodiments, the magnetic hardness of the alloy selected to form the magnetic layer 214 is directly proportional to the degree of chemical ordering of the alloy, where a fully-ordered form of the alloy has a significantly greater $H_K$ than a fully-disordered form of the alloy. Alternatively, in some embodiments the magnetic layer 214 is formed from a single alloy that has an $H_K$ that is a function of the molecular structure of the alloy. The alloy, having a first molecular structure (e.g., ordered $L1_0$), has a greater $H_K$ than the alloy having a second molecular structure (e.g., disordered, face-centered cubic (fcc) phase).

Use of a single alloy for the magnetic layer 214 may simplify manufacturing of the magnetic layer 214 by removing parts of the manufacturing process, such as adding a second material, mixing materials, preconditioning multiple materials, and the like. In an embodiment, an alloy including iron (Fe) and platinum (Pt) is used with the magnetic layer 214 because of the relatively large $H_K$ differential between different phases associated with such alloys. In alternative contemplated embodiments, other alloys may include Fe and Pd, cobalt (Co) and Pt, nickel (Ni) and Fe, manganese (Mn) and aluminum (Al), titanium (Ti) and Al, other Co-alloys, or other materials.

According to an embodiment, the alloy in a first portion 220 (e.g., sectional plane, sub-layer, region) of the magnetic layer 214 has a greater degree of chemical ordering that the alloy in a second portion 222 of the magnetic layer 214. In some embodiments, the first portion 220 of the magnetic layer 214 extends over the second portion 222, and is in direct contact therewith. While in order embodiments the first portion 220 is separated from the second portion 222 by one or more intermediate portions of the magnetic layer 214. The two portions 220, 222 may be magnetized in opposite orientations to form an exchanged-coupled composite, with the first portion 220 magnetically reinforcing the second portion 222 so as to provide reduced field strength and increased thermal stability characteristics of the recording media 210.

According to an embodiment, the first portion 220 of the magnetic layer 214 is closer to the substrate 212 than the second portion 222, such that the magnetic layer 214 is magnetically harder closer to the substrate 212 than further from the substrate 212. In at least one embodiment, the alloy of the first portion 220 of the magnetic layer 214 is primarily composed of a fully-ordered form of the alloy. In other contemplated embodiments, the magnetic layer 214 is arranged with a magnetically-harder portion of the magnetic layer 214 further from the substrate 212 than a magnetically-softer portion of the magnetic layer 214.

Still referring to FIG. 2, the magnetic layer 214 includes discrete sub-layers 224, 226 such that, within each sub-layer 224, 226, the alloy has a consistent molecular structure, but between the sub-layers 224, 226 the molecular structure of the alloy varies. Alternatively, in some embodiments the degree of chemical ordering of the alloy in the magnetic layer 214 varies discretely with respect to distance from the substrate 212 such that the alloy, in the first sub-layer 224, which is closer to the substrate 212, has a greater degree of chemical ordering than does the alloy in the second sub-layer 226, which is further from the substrate 212. In some embodiments, the alloy in the first sub-layer 224 is fully ordered, while the alloy in the second sub-layer 226 is disordered (e.g., fully disordered). Although shown in FIG. 2 to have about the same thickness, in other embodiments the first sub-layer is thicker than the second sub-layer, or vice versa.

According to an embodiment, the first and second sub-layers 224, 226 have substantially uniform thicknesses $H_1$, $H_2$. In some embodiments, the thicknesses $H_1$, $H_2$ of the first and second sub-layers 224, 226 are each between about one to ten nanometers. In other embodiments, one or both of the thicknesses $H_1$, $H_2$ of the first and second sub-layers 224, 226 are less than fifty nanometers, such as less than about thirty nanometers. In still other contemplated embodiments, one or both of the thicknesses $H_1$, $H_2$ of the first and second sub-layers 224, 226 are less than a nanometer or more than fifty nanometers. According to an embodiment, the combined thickness $H_T$ of the first and second sub-layers 224, 226 is between one-hundred picometers and one-hundred nanometers, such as between about five and thirty nanometers.

Figure 3:
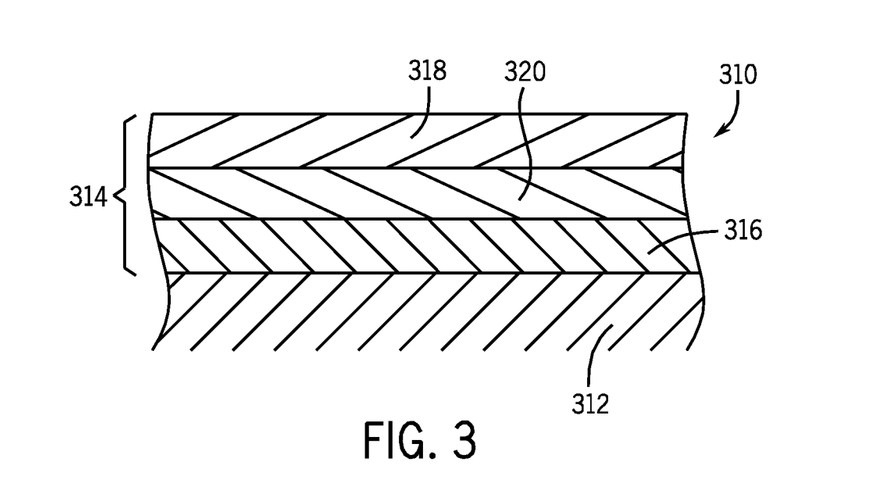
FIG. 3 is a sectional view of a schematic illustration of recording media according to another embodiment.

Referring to FIG. 3, a recording media 310 includes a substrate 312 and a magnetic layer 314. The magnetic layer 314 includes first, second, and third sub-layers 316, 318, 320. According to an embodiment, at least two of the sub-layers 316, 318, 320 are formed from a single alloy that has an $H_K$ that is a function of the degree of chemical ordering of the alloy. In some embodiments, the first sub-layer 316 includes a fully-ordered form of the alloy having a relatively high $H_K$ (e.g., magnetically hard) and the second sub-layer 318 includes a fully disordered form of the alloy having a relatively low $H_K$ (e.g., magnetically soft).

In some such embodiments, the third sub-layer 320 includes the alloy having a degree of chemical ordering that is between the degree of chemical ordering of the alloy in the first and second sub-layers 316, 318. The molecular structure of the alloy in the third sub-layer 320 is consistent in that the degree of chemical ordering of the third sub-layer 320 is uniform throughout the third sub-layer 320. Use of a third sub-layer 320 having a degree of chemical ordering intermediate to the first and second sub-layers 316, 318 is intended to further reduce the switching field while maintaining thermal stability of the recording media 310. In other such embodiments, the third sub-layer 320 includes a material that is not the alloy, such as a non-magnetic material or a different magnetic material. In other contemplated embodiments, a magnetic layer includes more than three discrete sub-layers.

Figure 4:
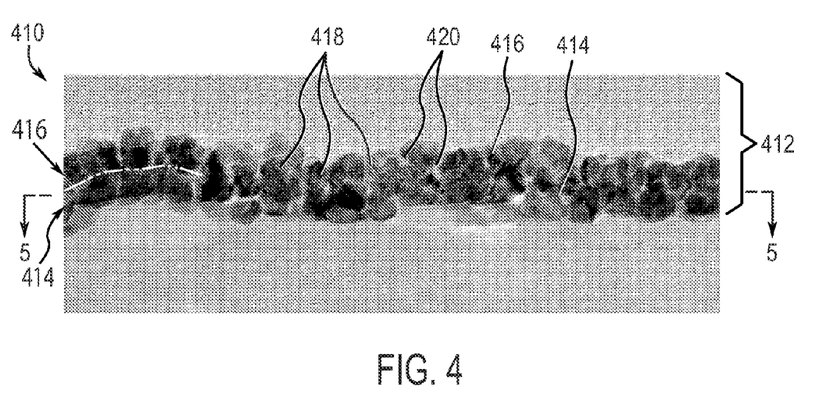
FIG. 4 is a sectional view of a schematic illustration of recording media according to yet another embodiment.
Figure 5:
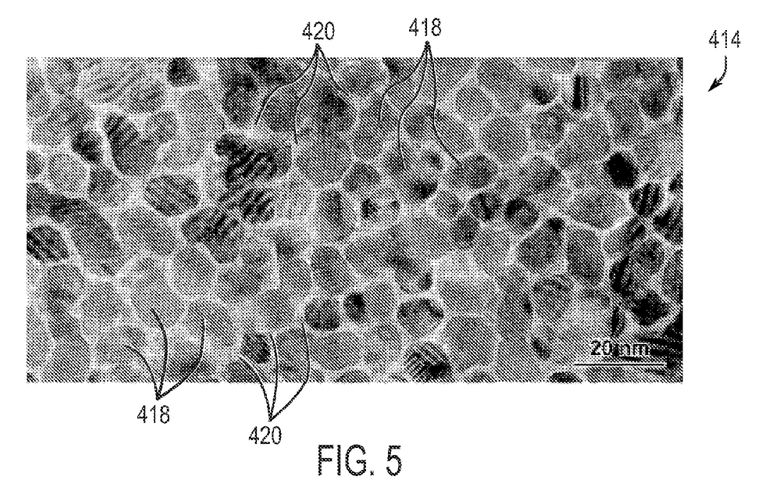
FIG. 5 is a top view of a schematic illustration of the section of the recording media of FIG. 4 taken along line 5-5 of FIG. 4 according to still another embodiment.

Referring now to FIGS. 4-5, a recording media 410 includes a magnetic layer 412 formed from a single alloy arranged in a first sub-layer 414 and a second sub-layer 416. By way of non-limiting example, the recording media 410 may be used with the disk drive 110, where FIG. 4 is a section of the disk 114 that is perpendicular to the recording surface 116, and FIG. 5 is a section of the disk 114 that is parallel to the recording surface 116 and within the disk 114. In such an example, the top of FIG. 4 corresponds to the visible portion of the recording surface 116 in FIG. 4.

According to an embodiment, the alloy includes Fe and Pt, and is herein referred to as "FePt—X," where the "X" of FePt-X designates the possible addition of one or more of a variety of elements or compounds, such as at least one of chromium (Cr), Ni, Cu, silver (Ag), C, boron (B), boron nitride (BN), silicon dioxide ($SiO_2$), titanium dioxide ($TiO_2$), and boron trioxide ($B_2O_3$). While an element or compound in addition to Fe and Pt in FePt—X may be used with recording media, in contemplated embodiments FePt—X may not include any elements or compounds in addition to Fe and Pt.

When arranged in a face-centered tetragonal molecular structure ("fct phase"; e.g., fully-ordered phase, $L1_0$ phase), FePt—X is believed by the Applicants to be one of the magnetically hardest materials. However when arranged in a face-centered cubic molecular structure ("fcc phase"; e.g., fully-disordered phase), FePt—X is believed to be magnetically soft. Use of FePt—X for the alloy of the magnetic layer 412 may be used, because the disparity between the $H_K$-values associated with the fct and fcc phases of FePt—X provides a particularly efficient exchange-coupled composite structure between the first and second sub-layers 414, 416 of the magnetic layer 412 of the recording media 410. For FePt, Applicants believe the anisotropy field $H_K$ could range from 0 for a fully disordered fcc phase up to 14 Tesla (or 140 kOe) for the completely ordered $L1_0$ phase. However, in other contemplated embodiments, other alloys or materials may be used.

According to an embodiment, the first sub-layer 414 of the magnetic layer 412 includes the FePt—X alloy having a granular microstructure. During manufacturing of the magnetic layer 412, columnar grain growth of the FePt—X alloy in the fct phase is controlled to provide grains 418 having an average grain size (e.g., diameter, or longest distance between two points on the surface) of less than about ten nanometers (see FIG. 5), such as less than twenty nanometers. According to an embodiment, C is used as a boundary material 420 for the alloy, because C is believed to facilitate formation of the granular microstructure of the first sub-layer 414 during manufacturing of the magnetic layer 412.

Figure 6:
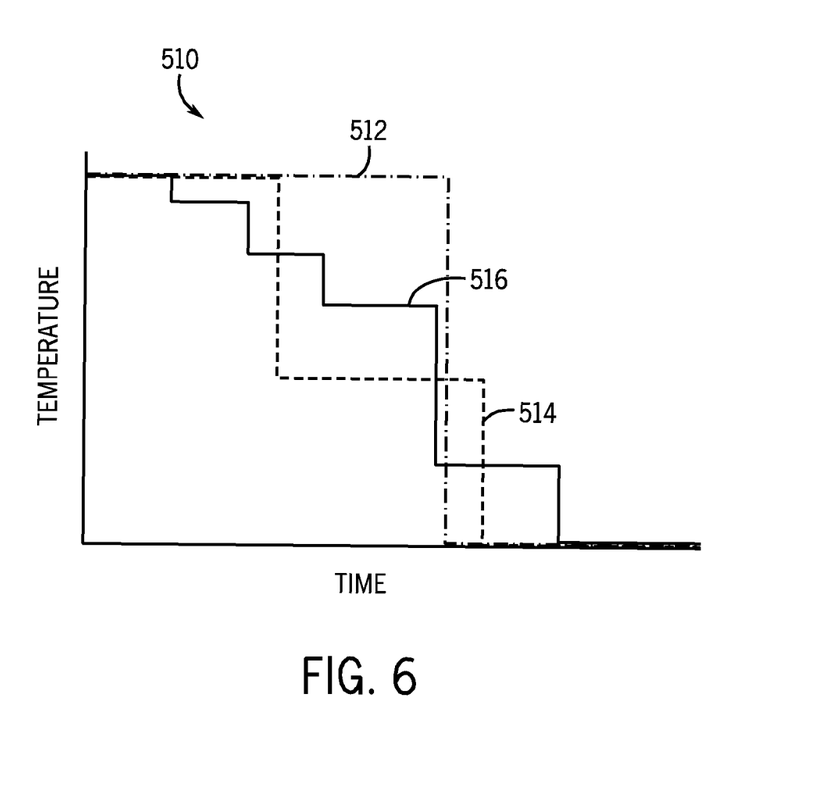
FIG. 6 is a graphical representation of temperature as a function of time for processes of manufacturing recording media according to embodiments.
Figure 8:
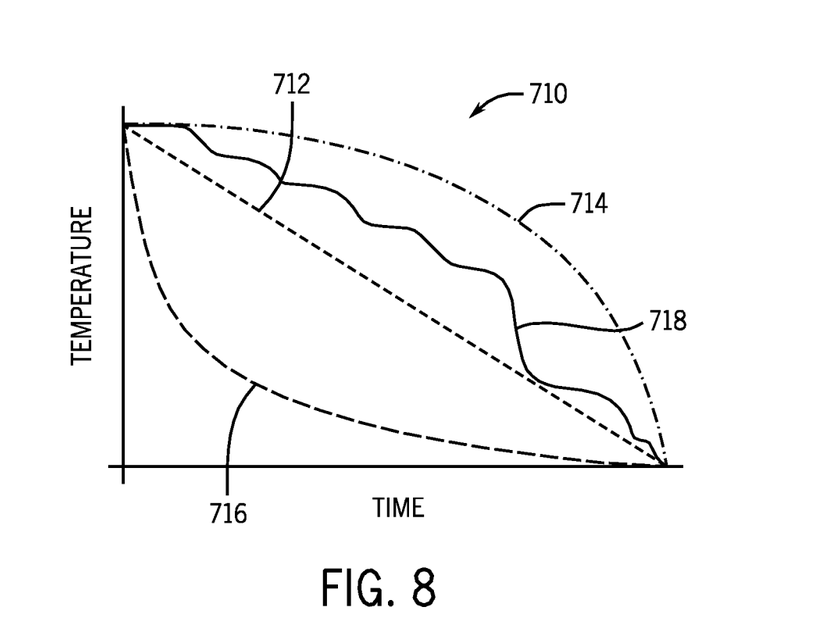
FIG. 8 is a graphical representation of temperature as a function of time for processes of manufacturing recording media according to other embodiments.

Referring generally to FIGS. 6 and 8, an alloy is selected for use in a magnetic layer of recording media (see, e.g., magnetic layer 214 and recording media 210 as shown in FIG. 2) that has an $H_K$ that is controllable during manufacturing of the magnetic layer as a function of one or more conditions (e.g., parameters, variables) that affect the molecular structure or degree of chemical ordering of the alloy. Some such conditions may include temperature of the alloy, additive materials, duration of time undergoing such conditions during a process of manufacturing the magnetic layer, etc. The alloy may be made to undergo the conditions during deposition of the magnetic layer on a substrate (e.g., via thin film deposition, physical deposition, chemical deposition, sputtering) or after the magnetic layer has been deposited (e.g., post-deposition treatment, annealing).

According to an embodiment, the molecular structure or degree of chemical ordering of the alloy is monotonically controllable as a function of one parameter, such as temperature. In such an embodiment, variation of the temperature of the alloy, either during deposition or after deposition, may be used to affect the molecular structure or degree of chemical ordering of the alloy. Applicants believe that the degree of chemical ordering of the FePt—X alloy, described above, is monotonically controllable as a function of process temperature. No additives are required to change the molecular structure of the FePt—X alloy from the fct phase to the fcc phase or vice versa. Use of an alloy that is monotonically controllable is intended to simplify the manufacturing process by obviating accounting for coupling effects between two or more variables, operating separate components configured to control different parameters, etc.

Referring specifically to FIG. 6, the process temperature of an alloy may be changed as the alloy is deposited to form a magnetic layer of recording media (see, e.g., magnetic layer 214 and recording media 210 as shown in FIG. 2), from a first temperature facilitating ordering of the alloy to a second temperature facilitating a less-ordered arrangement or a fully disordered arrangement of the alloy. As shown in a graphical representation 510 of FIG. 6, three hypothetical manufacturing processes 512, 514, 516 lower the temperature of the alloy as the alloy is being deposited on a substrate. During each manufacturing process 512, 514, 516, the rate of deposition of the alloy may be constant or may vary to facilitate particular responses in the formation of the magnetic layer, such as columnar growth of the alloy.

The first process 512 provides a single drop in temperature (e.g., discontinuity, sharp change in temperature), from a first temperature (e.g., about 700-degree Celsius for FePt—X alloy) believed to facilitate a fully-ordered form of the alloy to a second temperature (e.g., room temperature, 30-degree Celsius, greater than 500-degrees below than the first temperature) believed to facilitate a disordered form of the alloy. The first process 512 is intended to provide two sub-layers of the magnetic layer (see, e.g., magnetic layer 214 and recording media 210 as shown in FIG. 2), where the first sub-layer is magnetically hard and the second sub-layer is magnetically soft.

The second and third processes 514, 516 shown in FIG. 6 include process temperature-versus-time curves intended to provide more than two sub-layers within a magnetic layer of recording media by incrementally reducing the process temperature to one or more temperatures associated with intermediate degrees of chemical ordering of the alloy. In other contemplated embodiments, the temperature may be discretely raised, or both discretely raised and lowered, to provide a pre-determined structure of the magnetic layer.

In other contemplated embodiments, a first sub-layer of the magnetic layer may be deposited on the substrate, followed by annealing of the first sub-layer. The first sub-layer may then be cooled in a manner designed to facilitate or inhibit a particular molecular structure (e.g., crystallization) of the alloy. Then a second sub-layer of the magnetic layer may be deposited over the first sub-layer, and subsequently annealed and cooled. The annealing corresponding to the first and second sub-layers may be different, with each particularly tailored to produce a ratio of molecules having first and second molecular structures in the alloy. Additional sub-layers (e.g., third, fourth, fifth) may be added such that a graduated transition with respect to distance from the substrate is provided in the magnetic layer, such as from predominance of the first molecular structure to predominance of the second molecular structure.

Figure 7:
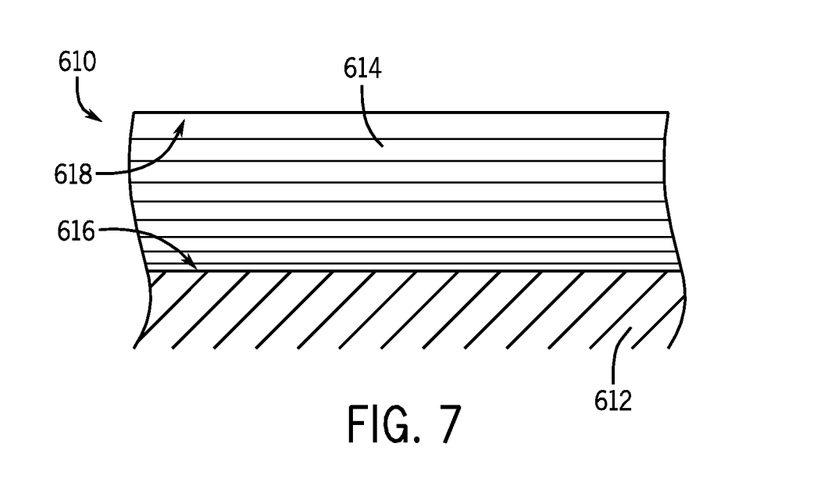
FIG. 7 is a sectional view of recording media according to another embodiment.

Referring now to FIG. 7, a recording media 610 includes a substrate 612 and a magnetic layer 614 coupled to the substrate 612. The magnetic layer 614 includes a single alloy that has an $H_K$ that is a function of the degree of chemical ordering of the alloy. The degree of chemical ordering of the alloy in a first portion 616 of the magnetic layer 614 is greater than the degree of chemical ordering in a second portion 618 of the magnetic layer 614. In some embodiments, the first portion 616 of the magnetic layer 614 is closer to the substrate 612 than the second portion 618 of the magnetic layer 614, while in other embodiments, vice versa.

Still referring to FIG. 7, the degree of chemical ordering of the alloy continuously changes within the magnetic layer 614. According to an embodiment, the degree of chemical ordering continuously decreases with respect to distance from the substrate 612 within the magnetic layer 614. In one such embodiment, the degree of chemical order continuously decreases within the magnetic layer 614 at a constant rate, from a fully-ordered portion of the magnetic layer to a fully disordered portion of the magnetic layer 614.

Referring now to FIG. 8, a graphical representation 710 of process temperature-versus-time curves are shown for four hypothetical manufacturing processes 712, 714, 716, 718 intended to respectively provide magnetic layers where the chemical ordering of a single alloy within each magnetic layer continuously changes (e.g., decreases) with respect to distance from a substrate. In a first process 712, the temperature is continuously decreased at a constant rate, which is intended to provide a magnetic layer that continuously transitions from a first degree of chemical ordering (e.g., fully ordered) to a second degree of chemical ordering (e.g., fully disordered), at a constant rate of change in the chemical ordering. The second process 714 is intended to provide a greater proportion of the magnetic layer having a higher degree of chemical ordering than the third process 716. The fourth process 718 is intended to form sub-layers of the alloy having a particular degree of chemical ordering, where the sub-layers continuously transition into one another. In other contemplated embodiments, the temperature may be continuously raised, or both continuously raised and lowered, to provide a predetermined structure of the magnetic layer. In still other contemplated embodiments, a process temperature may include continuously variable temperature changes, segments of constant temperatures, and/or discontinuous temperature changes (see, e.g., FIG. 6).

In other contemplated embodiments, annealing of a magnetic layer is intended to provide a continuous transition within the magnetic layer of a single alloy in a first phase to the alloy in a second phase. In some such embodiments, the magnetic layer may be first be deposited on a substrate (e.g., recording surface of a disk) in a fully-ordered phase Annealing and cooling may be conducted such that the alloy on one side (e.g., exposed side) of the magnetic layer is changed to a disordered phase while the alloy on another side of the magnetic layer remains in the fully-ordered phase. In such a process, the temperature may be controlled to provide a predetermined transition rate between the two phases of the alloy within the magnetic layer.

The construction and arrangements of the recording media, as shown in the various embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. For example, while FIGS. 6 and 8 show process temperature as a function of time, in other manufacturing processes of recording media, as described above, other parameters or multiple parameters may be changed with respect to time or another independent variable to provide a predetermined structure for a magnetic layer. Other substitutions, modifications, changes and omissions may also be made in the design, operating conditions and arrangement of the various embodiments without departing from the scope of the present invention.

What is claimed is:

1. A magnetic recording medium, comprising:
   a substrate; and
   a magnetic layer coupled to the substrate and comprising an iron platinum carbon alloy that has magnetic hardness that is a function of the degree of chemical ordering of the alloy, wherein a degree of chemical ordering of the alloy varies with respect to distance from the substrate within the layer.

2. The medium of claim 1, wherein the degree of chemical ordering of the alloy decreases within the magnetic layer with respect to distance from the substrate.

3. The medium of claim 1, wherein the alloy in a first portion of the magnetic layer consists essentially of a fully-ordered form of the alloy.

4. The medium of claim 1, wherein the alloy in a first portion of the magnetic layer has a granular microstructure with an average grain size of less than about ten nanometers.

5. The medium of claim 4, wherein carbon is used as a boundary material for the alloy in the first portion of the magnetic layer.

6. The medium of claim 5, wherein the alloy further comprises at least one of copper, chromium, zirconium, boron, tantalum, silicon dioxide, magnesium oxide, aluminum oxide, and boron trioxide.

7. The medium of claim 1, wherein the degree of chemical ordering of the alloy varies discretely with respect to distance from the substrate such that the alloy, in a first sublayer closer to the substrate, has a greater degree of chemical ordering than does the alloy in a second sub-layer that is further from the substrate.

8. The medium of claim 7, wherein the alloy in the first sub-layer is fully ordered, and wherein the alloy in the second sub-layer is disordered.

9. The medium of claim 1, further comprising:
   a seed layer between the substrate and the magnetic layer; and
   an overcoat overlaying the magnetic layer.

10. A magnetic recording medium, comprising:
    a substrate; and
    a magnetic layer coupled to the substrate and comprising an iron platinum carbon alloy that has magnetic hardness that is a function of the degree of chemical ordering of the alloy, wherein the magnetic layer comprises a first sub-layer having a hardness $H_{K1}$ and a second sub-layer having a hardness $H_{K2}$ and $H_{K1} > H_{K2}$.

11. The medium of claim 10, wherein the first sub-layer is closer to the substrate than the second sub-layer.

12. The medium of claim 10, wherein the alloy in the first sub-layer consists essentially of molecules having a face-centered tetragonal molecular structure, and wherein the alloy in the second sub-layer consists essentially of molecules having a face-centered cubic molecular structure.

13. The medium of claim 10, wherein the first sub-layer has a substantially uniform thickness, and wherein the second sub-layer has a substantially uniform thicknesses.

14. The medium of claim 13, wherein the thickness of the first sub-layer is between about one to ten nanometers, and wherein the thickness of the second sub-layer is between about one to ten nanometers.

15. The medium of claim 13, wherein the combined thickness of the first and second sub-layers is between about five to thirty nanometers.

16. A magnetic recording medium comprising:
   a substrate; and
   a magnetic layer of an iron platinum carbon alloy coupled to the substrate, wherein a degree of chemical ordering of the iron platinum carbon alloy decreases with respect to increasing distance from the substrate within the layer.

17. The medium of claim 16, wherein the degree of chemical ordering of the iron platinum carbon alloy continuously decreases within the magnetic layer with respect to distance from the substrate.

18. The medium of claim 16, wherein the degree of chemical ordering of the iron platinum carbon alloy varies discretely with respect to distance from the substrate such that the iron platinum carbon alloy, in a first sublayer closer to the substrate, has a greater degree of chemical ordering than does the iron platinum carbon alloy in a second sub-layer that is further from the substrate.

\* \* \* \* \*